United States Patent

[11] 3,589,452

| [72] | Inventors | Edwin J. Haker<br>Elm Grove;<br>Charles F. Riddle, Brookfield; William H.<br>Buelow, Brookfield, all of, Wis. |
|---|---|---|
| [21] | Appl. No. | 883,761 |
| [22] | Filed | Dec. 10, 1969 |
| [45] | Patented | June 29, 1971 |
| [73] | Assignee | Rex Chainbelt Inc.<br>Milwaukee, Wis. |

[54] TINE-MOUNTING ASSEMBLY
10 Claims, 7 Drawing Figs.

[52] U.S. Cl. ................................................ 172/548,
37/142, 37/189, 172/51, 172/119, 287/95, 299/91,
306/1.6
[51] Int. Cl. ................................................ A01b 33/14,
E21z 13/00
[50] Field of Search ................................................ 172/51,
118, 112, 120, 121, 122, 177, 169, 540, 556, 548,
550, 185, 184, 555; 37/141, 142, 189; 306/1.5,
1.6; 287/57, 95; 299/91

[56] References Cited
UNITED STATES PATENTS

| 2,802,408 | 8/1957 | Seaman | 172/548 |
|---|---|---|---|
| 3,205,015 | 9/1965 | Krekeler | 299/91 |
| 3,362,482 | 1/1968 | Riddle | 172/548 |

*Primary Examiner*—Robert E. Pulfrey
*Assistant Examiner*—C. W. Hanor
*Attorneys*—Ernst W. Schultz and Joseph J. Jochman, Jr.

ABSTRACT: An improved assembly for securing a digging and pulverizing tine to the tine-carrying plate of a rotary earth-working machine includes a U-shaped tine holder secured to a tine plate to form an open-ended socket for receipt of the shank of a tine. Notches in the end and rearward edge of the tine shank are adapted to receive a pair of pins secured within the socket to establish the working position of the tine. The socket provides the primary load-carrying portion of the assembly in operation. A demountable pin inserted into the socket and into engagement with the tine holds the same in the working position without being subject to any working load and allows rapid tine replacement.

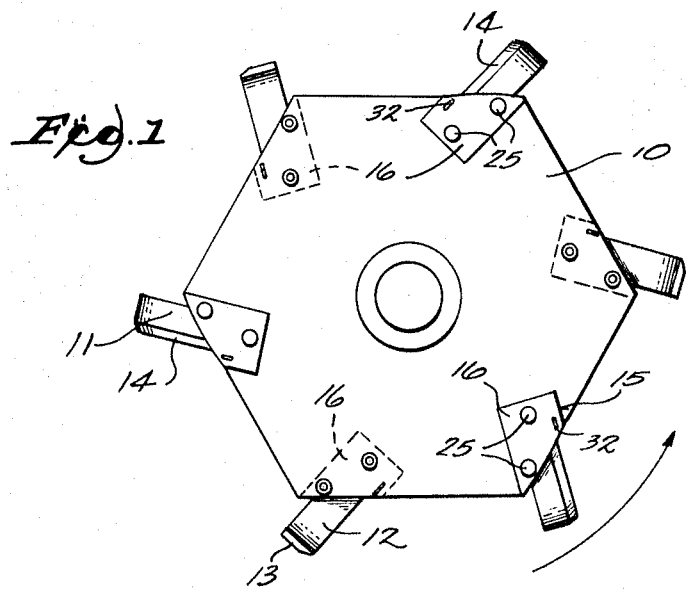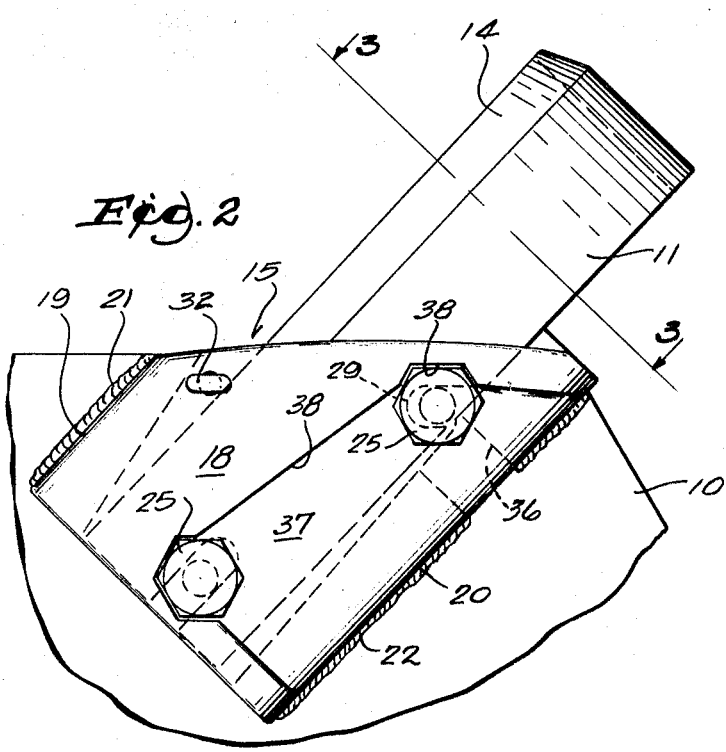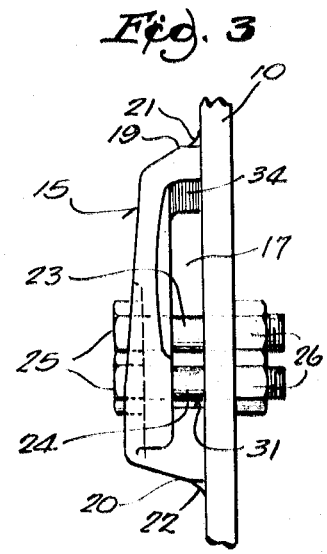

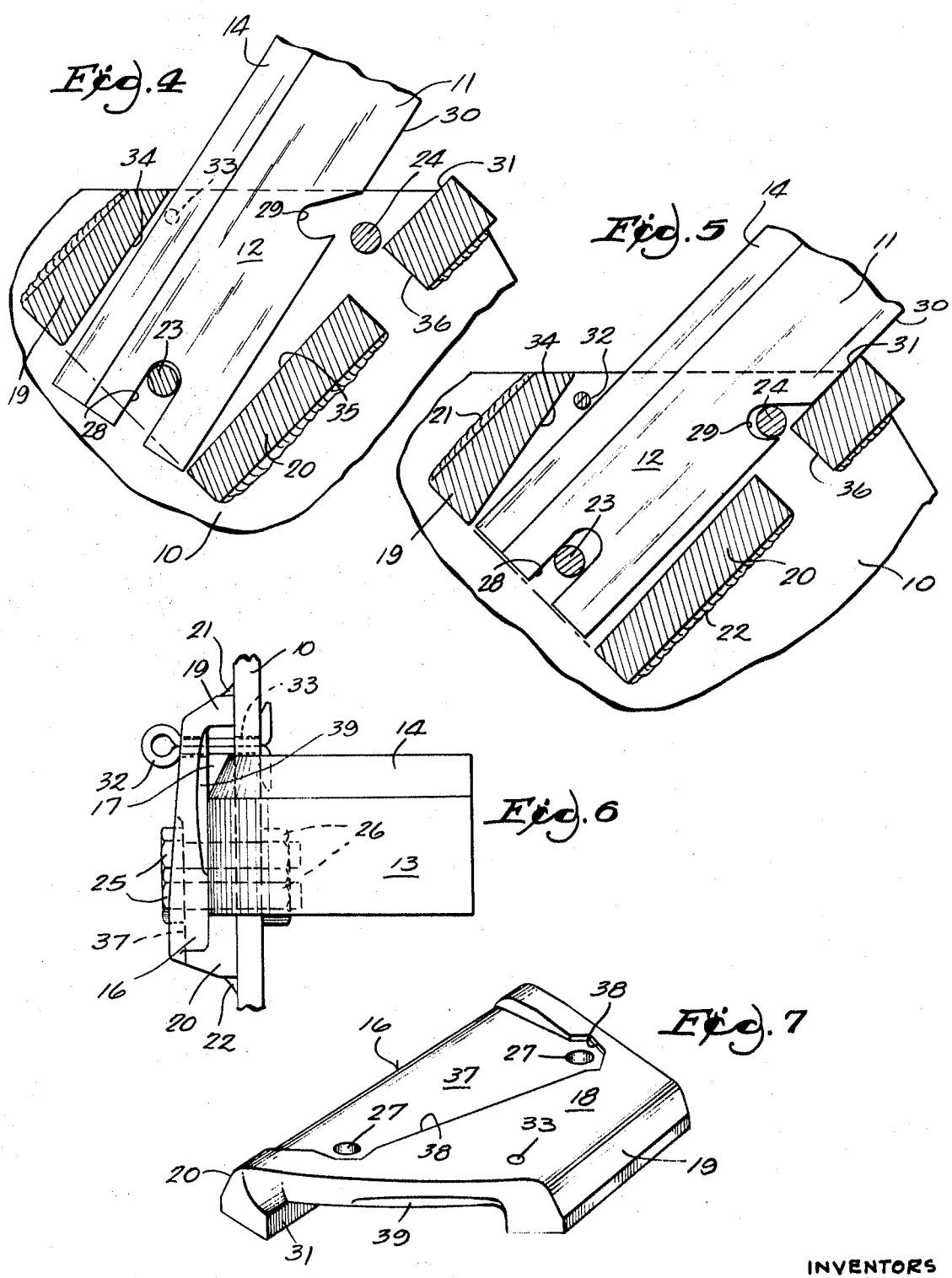

3,589,452

TINE-MOUNTING ASSEMBLY

BACKGROUND OF THE INVENTION

The present invention pertains to the art of rotary earth-working implements and more particularly to such implements employing a transversely disposed rotor shaft mounting a series of axially spaced tine plates each carrying a number of radially extending digging and pulverizing tines.

Rotary earth-working implements of this type are well known in the art and have found particular use in road construction applications. In road construction, the implements are used variously to mix, pulverize, blend, aerate and stabilize soils and other roadway base materials.

The kinds of materials worked are often highly abrasive and cause extremely rapid wear of the tines. Since a typical rotor may carry as many as 80 to 120 or more digging tines, means for rapidly removing worn tines and mounting new ones is highly desirable. The tines are also subject to heavy loading in operation and the tine-mounting means must, therefore, also possess the strength necessary to maintain the tines securely in working position.

Examples of prior art types of tine-mounting apparatus are shown in U.S. Pat. Nos. 2,802,408 and 3,362,482. The former discloses a tine mounted to a tine plate with a clamping bar and a pair of bolts, and in the latter a similar tine is held between a pair of abutment members by a resilient wedge and a pin. Both of the prior art tine mounts are intended to provide rapid means for changing the expendable tines.

The prior art mounting shown in U.S. Pat. No. 2,802,408 requires the loosening and retightening of two bolts for the replacement of each tine, which procedure becomes very time consuming when the tines for a complete rotor are being changed. Additionally, the bolt heads and associated nuts are completely exposed to the often abrasive action of the material being worked by the rotor. As a result, both the bolt heads and nuts are rapidly worn away to a condition wherein they cannot be grasped by conventional tools. This, of course, adds substantially to the time required to change tines.

The prior art tine holder shown in U.S. Pat. No. 3,362,482 requires only that the resilient wedge be driven out, as with a hammer, to demount the tine and, similarly, the new tine is secured by driving the wedge back into position. This more rapid changing means has been found, however, to have insufficient strength to maintain the tine in proper working position. Thus, neither the abutment members nor the resilient wedge are strong enough to withstand the shock loads often encountered in operation and the high torque or twisting stresses inherently imposed on the tine and holder because of the offset cutting head design of the tine.

SUMMARY OF THE INVENTION

In the present invention a heavy-duty socket provides a mounting for a tine with sufficient strength to absorb severe shock loads and which is particularly adapted to handle the high torque or twisting stresses transmitted to the socket by the L-shaped tine. Worn tines may be removed for replacement by removal of a single pin. The ease and speed with which the pin may be removed is not affected by abrasive wear or other damage caused the pins in operation, and such pins may conveniently include any of a number of inexpensive and readily available items.

BRIEF DESCRIPTION OF THE DRAWING

FIG. 1 shows the general arrangement of tine-mounting assemblies of the present invention securing tines to the rotor plate of a rotary earth-working implement.

FIG. 2 is an enlarged view of one of the tine-mounting assemblies of FIG. 1.

FIG. 3 is a view taken on line 3-3 of FIG. 2 with the tine and its retaining pin removed.

FIG. 4 is a view similar to FIG. 2 with the plate portion of the tine holder cut away and showing the assembly position of the tine.

FIG. 5 is a view similar to FIG. 4 showing the fully mounted working position of the tine.

FIG. 6 is a view similar to FIG. 3 and additionally showing the mounted tine and the removable retaining pin.

FIG. 7 is a perspective view of the tine holder of the present invention.

DESCRIPTION OF THE PREFERRED EMBODIMENT

In FIG. 1 there is shown a rotor plate 10 of the kind commonly mounted in series along the transversely disposed rotor of a known type of rotary earth-working implement. Each plate 10 carries a number of circumferentially spaced and generally radially extending digging tines 11. The plate is mounted for rotation in the direction of the arrow in FIG. 1.

Each of the tines includes an elongated shank 12 by which the tine is secured to the rotor plate 10, and a cutting head 13 extending at a right angle from the shank 12. The leading or rotationally forward edge 14 of each tine 11 is beveled to provide an appropriate cutting edge.

The tine-mounting assembly of the present invention is designated generally by the numeral 15. In order to keep each rotor plate balanced for the rapid rotational speed at which it operates, alternately disposed right- and left-hand mounting assemblies and tines are required, as are shown in FIG. 1. In all other respects the alternate tines and mounting assemblies are structurally and operatively alike and the description hereafter will be applicable to either type of assembly and tine.

Each tine-mounting assembly 15 includes a shallow U-shaped tine holder 16 secured to the rotor plate 10 and forming therewith an open-ended tine-receiving socket 17. The tine holder 16 includes a holder plate 18 and forward and rear radially extending supports 19 and 20, respectively. The holder plate 18 and the supports 19 and 20 may be separately formed and attached to the rotor plate 18. However, the tine holder 16, as is best shown in FIG. 7, is preferably formed as a unitary steel casting and is secured to the rotor plate 18 by a pair of welds 21 and 22 on the outside of the supports 19 and 20, respectively.

A first pin 23 and a second pin 24 are disposed within the tine-receiving socket 17 and extend between the rotor plate 10 and the holder plate 18. The pins 23 and 24 preferably comprise a pair of bolts 25 extending through aligned holes 27 in the plates 10 and 18 and secured with a corresponding pair of nuts 26.

Referring particularly to FIGS. 4 and 5, the first pin 23 is located such that it will be received in a locating notch 28 in the shank end of the tine 11 inserted into the socket 17 from the radially outer open end thereof. From its assembly position of FIG. 4 the tine 11 is rotated rearwardly about the first pin 23 until the second pin 24 is partially received by a retaining notch 29 in the rear edge 30 of the tine. Further rotationally rearward and radially outward movement of the tine 11 brings the retaining notch 29 into full engagement with the second pin 24, and abutment of the rear edge 30 of the tine with the abutment surface 31 on the inside of the rear support 20 establishes the working position of the tine, as shown in FIG. 5.

To hold the tine 11 in the working position a removable retaining pin 32 is inserted through a pair of aligned holes 33 in the rotor plate 10 and holder plate 18. The pin 32 prevents movement of the tine from the working position of FIG. 5 to the assembly position of FIG. 4 by abutment with the cutting edge 14 of the tine. As will be described in greater detail below, the retaining pin 32 is located so that it carries none of the working load imparted to the tine-mounting assembly 15 by the tine 11 as it strikes the material being worked. Since the pin functions primarily only to prevent the tine from falling out of its working position, it may be of comparatively light construction and may include any of a number of suitable substitutes for the cotter pin 32, as shown in FIG. 6. For example, a nail or spike of appropriate size with the end bent over after insertion has been found to work very well.

The inside surface 34 of the forward support 19 and a portion of the inside surface 35 of the rear support 20 are appropriately tapered, as best shown in FIGS. 4 and 5, to provide clearance for insertion of the tine 11 past the second pin 24. The radially inward open end of the socket 17 provides the required opening for the shank end of the tine 11 in the assembly position of FIG. 4.

The open-ended tine socket 17 formed by attaching the holder 16 to the rotor plate 10 additionally precludes an undesirable buildup within the socket of soil or other material being worked. Material which is unavoidably packed into the socket during operation will be loosened by movement of the worn tine from the working position to the assembly position as for removal. The loosened material may then fall freely from the socket through either end and leave the socket unobstructed for insertion of a replacement tine.

A particularly troublesome buildup of material was found to occur between the second pin 24 and the inside surface 35 of the rear support 20. This buildup interfered with the proper seating of the pin 24 in the retaining notch 29 of the tine and necessitated the provision of a relief hole 36 in the rear support 20 adjacent the second pin 24. As the tine is moved into the working position, as previously described the pointed end of the notch 29 pushes any trapped material into the relief hole 36 so that the rear edge 30 of the tine will positively engage the abutment surface 31.

In operation, the rotating tines are subject to high impact and working loads which are transferred directly to and must be satisfactorily absorbed by the tine-mounting assemblies 15. The L-shaped design of the tine 11 with its offset cutting head 13 produces a substantial torque or twisting load on the mounting assembly. The mounting assembly is designed such that the greater portion of the load thereon is absorbed by the tine holder 16. Most of the direct loading on the tine is transmitted to the abutment surface 31 of the rear support 20. The torque or twisting load is transmitted to the holder plate 18 principally in the area adjacent the abutment surface 31 and to the rotor plate 10. The heavy integral construction of the cast steel tine holder 16 provides with the rotor plate 10 a tine-holding socket 17 with the capacity to carry any of the various loadings to which the tine is subjected.

Because of the careful design and placement of the primary load-carrying portions of holder 16, the first and second mounting pins 23 and 24 carry significantly less load than in similar prior art structures. As an example, because the unitary holder 16 is welded to the rotor plate 10, the pins 23 and 24, in their preferred form as bolts 25, do not function as tension members in resistance to the torque loads described previously.

The loads to which the pins 23 and 24 are subjected, such as in resistance to the tendency of the loaded tine to pivot on its rear edge 30 about the abutment 31, are readily handled by them, and, therefore, are not transmitted to the small retaining pin 32. Should, however, one of the pins 23 or 24 be damaged, it can be readily replaced.

To protect the heads of the bolts 25 from the extremely abrasive action of some of the materials in which the assembly operates, a recessed portion 37 is provided in the part of the holder 16 including the bolt holes 27. As may be seen in the drawing, the raised portion 38 surrounding the attached bolts 25 forms a shield in the direction in which the assembly rotates. Should a bolt be damaged and its replacement necessitated, the ability to grasp the bolt head with a wrench to loosen it can afford a substantial time saving.

As shown in FIGS. 2 and 7, the raised portions 38 immediately adjacent the heads of the bolts 25 may be formed in a manner to conform to the shape of the heads and thereby hold the bolts against rotation. This allows attachment of the nuts 26 to the bolts or their removal therefrom with a single wrench.

It is important that the rear edge 30 of the tine in the working position be in positive contact with the abutment surface 31 in order that the loads on the tine are appropriately transmitted to the tine-holding assembly, as previously described. Because the tines are not manufactured to exacting tolerances, the retaining notch 29 is made deep enough to insure that the second pin 24 will not "bottom" therein, despite possible manufacturing inaccuracies.

It has been found that the buildup within the tine socket of material being worked, though potentially troublesome when the tine is replaced, serves a valuable function in wedging the tine tightly in the working position. The tolerances to which the tine and mounting assembly are made do not always provide a snug fit for the mounted tine and, as a result, the tines may rattle in the sockets until there is a sufficient buildup of material. To promote a more rapid and effective buildup of material, the holder 16 is provided with a tapered ramp 39. The ramp 39 provides an enlarged opening to the socket 17 to facilitate the packing of the material being worked into the portions of the socket not occupied by the tine.

Though the invention has been shown and described with reference to a preferred embodiment, it will be understood by those skilled in the art that certain changes may be made in form and detail without departing from the scope of the invention.

What we claim is:

1. In an earth-working implement having a rotor plate for carrying a series of radially projecting expendable tines, the radially inner end of the shank of each tine having a locating notch for a first pin carried by the rotor plate and the rear edge of the shank having a retaining notch for a second pin carried by the rotor plate and arranged such that said tine has an assembly position on the first pin which is rotationally forwardly of the second pin and a working position on both pins which is spaced rotationally rearward of the assembly position, improved means for securing said tine on said pins which comprises a tine holder overlying the rotor plate and including integral radially extending forward and rear supports, said holder and said rotor plate defining a socket which is open at its radially inner and outer ends, the forward and rear supports of said tine holder being welded to the rotor plate and being spaced to receive the tine therebetween in said assembly position and so that the rear support of the tine holder abuts the tine in said working position, and removable means interposed between the forward support and the tine for securing the tine against displacement from the working to the assembly position except as for replacement.

2. The invention of claim 1 wherein the retaining notch is disposed at an acute angle to the rear edge of the shank such that the working position is spaced rotationally rearward and radially outward of the assembly position.

3. The invention of claim 2 wherein said first and second pins comprise a pair of demountable bolts.

4. In an earth-working implement having a rotor plate for carrying a series of radially projecting expendable tines, the radially inner end of the shank of each tine having a locating notch for a first pin carried by the rotor plate and the rear edge of the shank having an angular retaining notch for a second pin carried by the rotor plate and arranged such that said tine has an assembly position on the first pin which is rotationally forwardly of the second pin and a working position on both pins which is spaced rotationally rearward and radially outward of the assembly position, improved means for securing said tine on said pins which comprises a holder plate overlying the rotor plate and radially extending supports which with said plates define a socket which is open at its radially inner and outer ends, the rotationally forward and rear supports of the holder plate being welded to the rotor plate and being spaced to receive the tine therebetween in said assembly position and so that the rear support of the plate abuts the tine in said working position, and removable means interposed between the forward support and the tine for securing the tine against displacement from the working to the assembly position except as for replacement.

5. The invention of claim 4 wherein said holder plate and said forward and rear supports comprise an integral U-shaped tine holder.

6. The invention of claim 5 wherein said U-shaped tine holder comprises a steel casting.

7. The invention of claim 5 wherein said removable means comprises a pin extending through aligned holes in said holder and rotor plates and engageable with the forward edge of the tine shank.

8. The invention of claim 4 wherein said first and second pins are demountable.

9. The invention of claim 8 wherein said demountable first and second pins comprise a pair of bolts.

10. The invention of claim 6 wherein said first and second pins comprise a pair of demountable bolts.